United States Patent [19]

Kagohata et al.

[11] Patent Number: 4,899,930

[45] Date of Patent: Feb. 13, 1990

[54] TEMPERATURE CONTROLLER FOR AUTOMOBILE AIR CONDITIONER

[75] Inventors: Tsuneo Kagohata; Toshikazu Ito, both of Ibaraki, Japan

[73] Assignee: Hitachi, Ltd., Tokyo, Japan

[21] Appl. No.: 353,702

[22] Filed: May 18, 1989

[30] Foreign Application Priority Data

May 20, 1988 [JP] Japan ................................. 63-122056

[51] Int. Cl.$^4$ ............................................. B60H 3/00
[52] U.S. Cl. .................................... 236/91 F; 165/43; 236/13; 62/186
[58] Field of Search .................. 236/13, 91 F; 165/43; 62/186, 209

[56] References Cited

U.S. PATENT DOCUMENTS

| | | | |
|---|---|---|---|
| 4,381,074 | 4/1983 | Iidima et al. | 236/13 |
| 4,697,734 | 10/1987 | Ueda | 236/13 |
| 4,757,944 | 7/1988 | Kagohata et al. | 236/91 F |

FOREIGN PATENT DOCUMENTS

| | | | |
|---|---|---|---|
| 0077215 | 5/1982 | Japan | 236/13 |
| 58-136509 | 8/1983 | Japan . | |

*Primary Examiner*—William E. Wayner
*Attorney, Agent, or Firm*—Antonelli, Terry & Wands

[57] ABSTRACT

A temperature controller for automobile air conditioner comprises first computation means which calculates, in correspondence to each delivered air temperature, a unit variation of heat exchange output required to vary the temperature of air delivered by the air conditioner by a unit temperature difference, a second computation means which calculates the amount of variation of heat exchange output, which is required to bring the delivered air temperature close to a target temperature, based on the target temperature, the detected temperature and the unit variation, and control means which controls the heat exchange output intermittently in compliance with the amount of variation evaluated by the second computation means.

5 Claims, 7 Drawing Sheets

TEMPERATURE CONTROLLER FOR AUTOMOBILE AIR CONDITIONER

BACKGROUND OF THE INVENTION

This invention relates to a temperature controller for automobile air conditioner, and particularly to a temperature controller for automobile air conditioner suitable for automatically controlling the temperature of air delivered from the air conditioner.

Automobile air conditioners which have been provided separately as a cooler unit and a heater unit tend recently to integrate these units, establishing a reheat-air mix system which is superior in the continuous temperature control property and also provides an extra dehumidification function. An automobile air conditioner of the reheat-air mix type operates in such manner that target opening am of an air mix door is determined from the difference between the target delivered air temperature Tdo and the actual delivered air temperature Td, and the opening of the air mix door is controlled so that the voltage produced by a potentiometer which responds to the movement of the air mix door is consistent with the target value $\theta_{am}$, thereby attaining the target temperature $\theta_{am}$, as disclosed in Japanese Patent Unexamined publication No. 58-136509 for example.

The same applicant as of the present invention proposed, in U.S. patent application Ser. No. 093,228 on Sept. 4, 1987, a temperature controller for automobile air conditioner, which does not use a feedback potentiometer for detecting the opening of the air mix door, but operates to vary the opening of the air mix door in response to the target delivered air temperature Tdo and actual delivered air temperature Td so that the delivered air temperature Td is brought close to the target temperature Tdo.

Among the above-mentioned conventional temperature controllers for automobile air conditioner, the one using a feedback potentiometer for implementing control, which is based on the information on the opening of the air mix door, achieves a stable control even in the presence of nonlinear sections in the characteristics of the heat exchanger. On the other hand, however, this system necessitates a link mechanism between the feedback potentiometer and air mix door and its adjustment at assembly, and further necessitates the calculation of the target opening $\theta_{am}$, the analysis of the voltage signal from the potentiometer, and the process for compensating the variability of characteristics between the opening of air mix door and the rotational angle of potentiometer, resulting in an increased complexity of control specifications. In consequence, when microcomputer-based control is intended, it needs an increased program loading area, which raises the manufacturing cost along with the above-mentioned intricacy of adjustment work and also deteriorates the reliability and durability of the controller due to an increased number of component parts.

Whereas, the above-mentioned system, which was proposed by the applicant of the present invention with the intention of controlling the delivered air temperature Td more directly without using a potentiometer for detecting the opening of air mix door, is simpler in structure and lower in manufacturing cost. However, it leaves a problem in that accurate control and thus stable control is not achieved if a unit variation in the heat exchange output for producing a unit variation in the delivered air temperature Td is not unique due to the nonlinearity of characteristics of the heat exchanger.

SUMMARY OF THE INVENTION

This invention is intended to overcome the current situation of temperature controllers for automobile air conditioner of the type mentioned above, and its prime object is to provide a temperature controller for automobile air conditioner which adopts the scheme of direct control for the delivered air temperature Td thereby to enhance the response of control system, eliminate the feedback potentiometer, simplify the structure, improve the reliability and control accuracy and reduce the manufacturing cost, and performs accurate and stable temperature control invariably by overcoming the possible presence of nonlinear sections in the characteristics of heat exchanger.

The above objective is achieved by the provision of a first computation means and a second computation means. The first computation means calculates, for each delivered air temperature, a unit variation of heat exchange output required for producing a unit variation of delivered air temperature, and the second computation means which calculates the amount of variation of heat exchange output required for bringing the delivered air temperature close to the target temperature.

Figure 12:
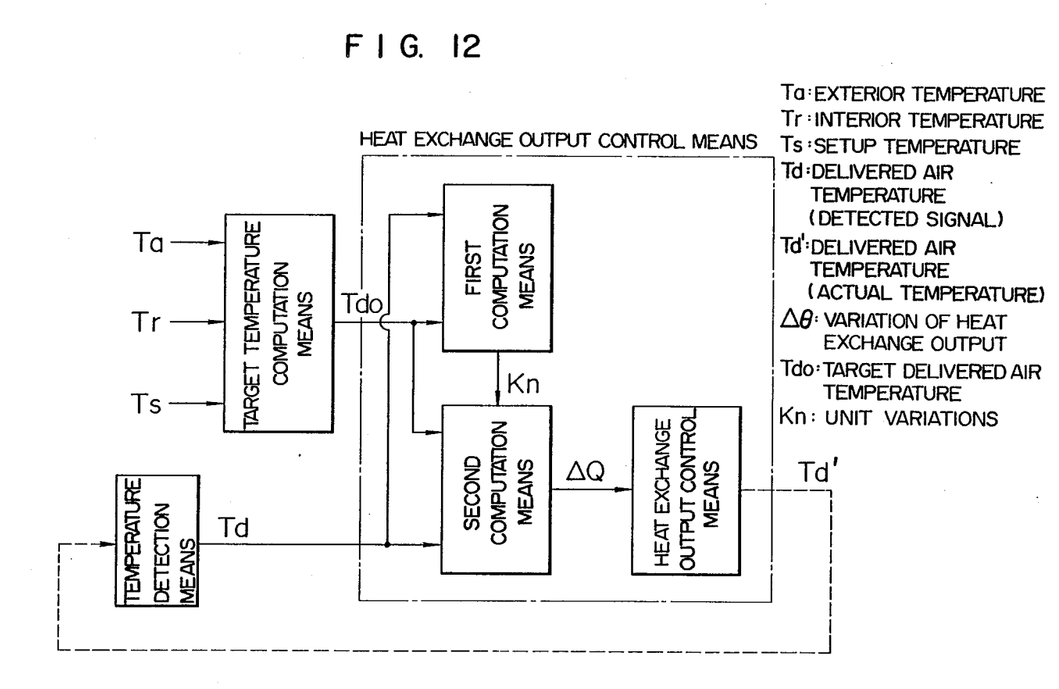
FIG. 12 is a block diagram showing the heat exchange output control means according to this invention.

Namely, the present invention resides in a temperature controller for automobile air conditioner, in which are included target delivered air temperature computation means which calculates the target delivered air temperature from signals of at least the exterior ambient temperature, the cabin interior temperature and the setup temperature, delivered air temperature detection means which detects the temperature of air delivered by the air conditioner, and heat exchange output control means which controls the heat exchange output to vary the delivered air temperature so that the detected value of delivered air temperature is brought to the target value convergently. Specifically, as shown in the functional block diagram of FIG. 12, the arrangement comprises first computation means which calculates, in correspondence to each delivered air temperature, a unit variation of heat exchange output required to vary the delivered air temperature by a unit temperature difference, second computation means which calculates the amount of variation of heat exchange output, which is required to bring the delivered air temperature close to the target temperature, from the target delivered air temperature, the detected delivered air temperature and the unit variation, and control means which controls the heat exchange output intermittently in compliance with the amount of variation evaluated by the second computation means.

According to this invention, the target delivered air temperature is calculated by a target delivered air temperature calculation means from at least the exterior ambient temperature, the cabin interior temperature and the setup temperature.

Figure 2:
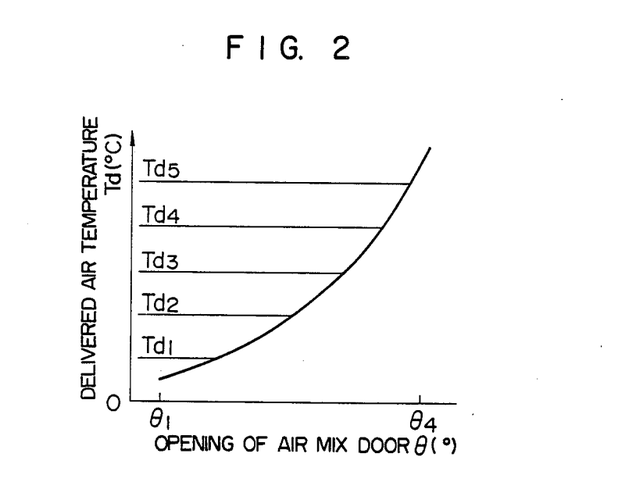
FIG. 2 shows the air mix door opening vs. delivered air temperature characteristics.

In case the heat exchange output is regulated through the control of the opening of air mix door of the air conditioner, the door opening $\theta$ vs. delivered air temperature Td characteristics generally exhibit a nonlinearity as shown in FIG. 2. According to this invention, the first computation means calculates a unit variation of heat exchange output in terms of the opening of air mix door required for producing a unit variation in the delivered air temperature Td in correspondence to each delivered air temperature. Subsequently, the second computation means makes reference to the target delivered air temperature calculated by a target temperature calculation means, the actual delivered air temperature detected by a temperature detection means and the unit variation to calculate the amount of variation of heat exchange output in terms of the opening angle of the air mix door required for bringing the delivered air temperature close to the target temperature.

In response to the demanded variation of output calculated by the second computation means, the control means operates the air mix door intermittently. In this case, the actuator which drives the air mix door has the duration of operation varied in correspondence to the unit variation calculated by the first computation means, thereby implementing a stable control which matches the nonlinear characteristics shown in FIG. 2. The control for the opening of the air mix door by the control means takes place intermittently only when the delivered air temperature Td is recognized to be stable.

BRIEF DESCRIPTION OF THE DRAWINGS

FIGS. 1 through 6 are diagrams used to explain an embodiment of this invention, in which:

FIGS. 7 through 11 are diagrams used to explain another embodiment of this invention, in which:

DESCRIPTION OF THE PREFERRED EMBODIMENTS

Figure 1:
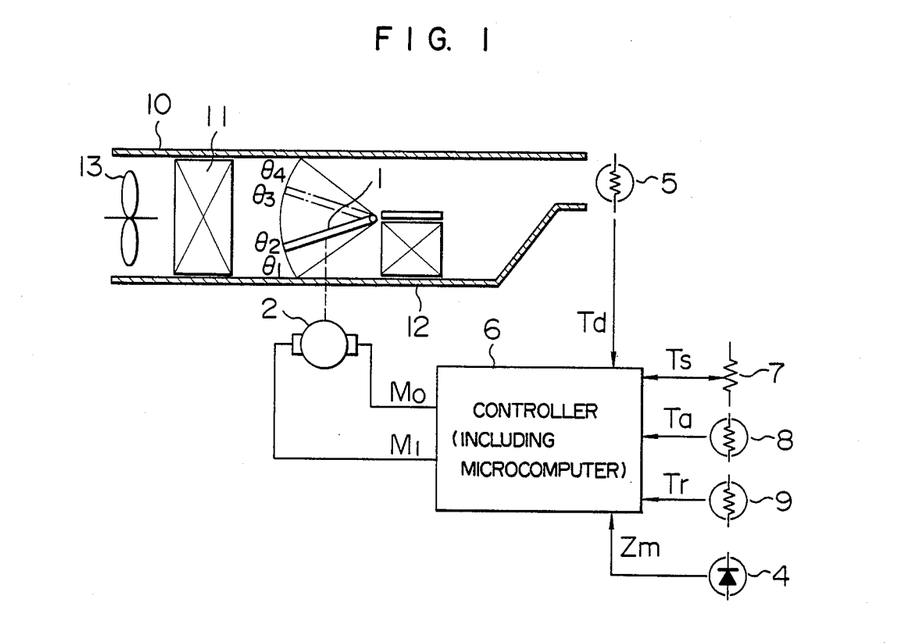
FIG. 1 shows the principal structure of the air conditioning system.
Figure 3:
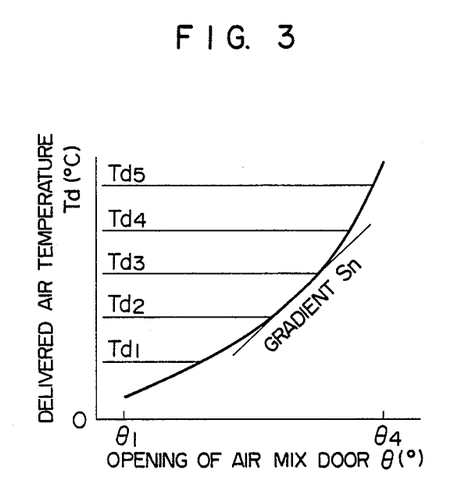
FIG. 3 explains the method of determining a unit temperature variation from the gradient of a mean delivered air temperature.
Figure 4:
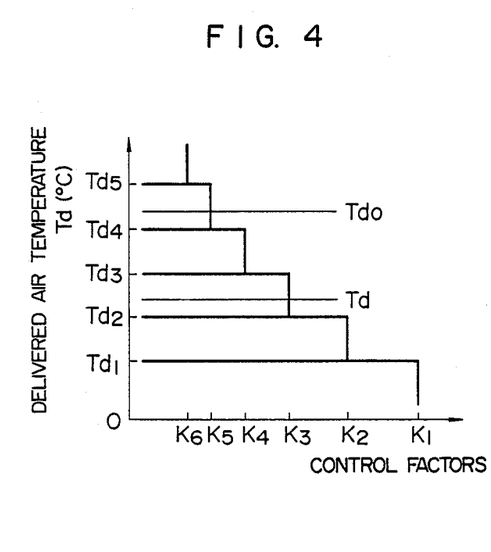
FIG. 4 explains the method of determining control factors against delivered air temperatures.
Figure 5:
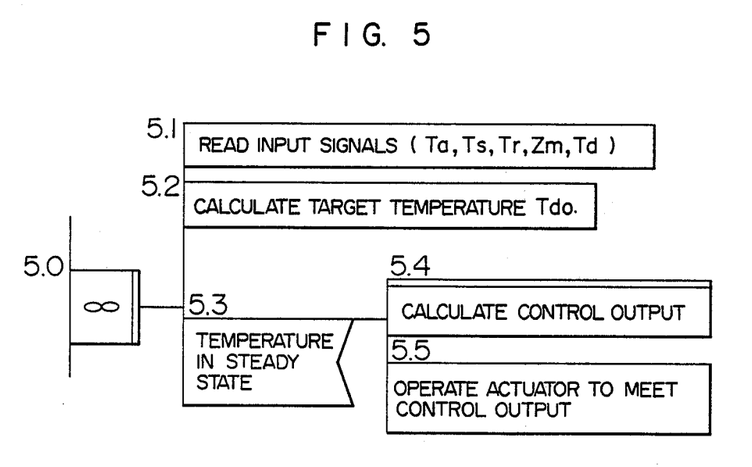
FIGS. 5 and 6 explain the operation of the system.
Figure 6:
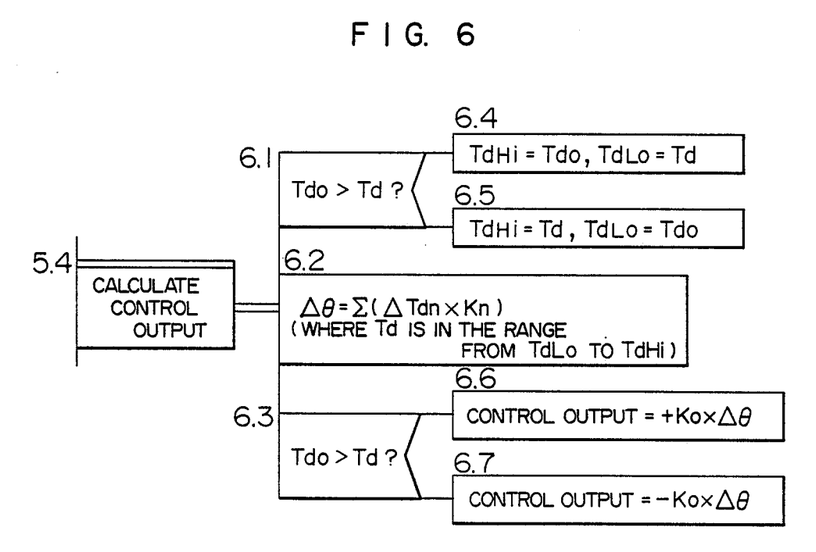
Figure 7:
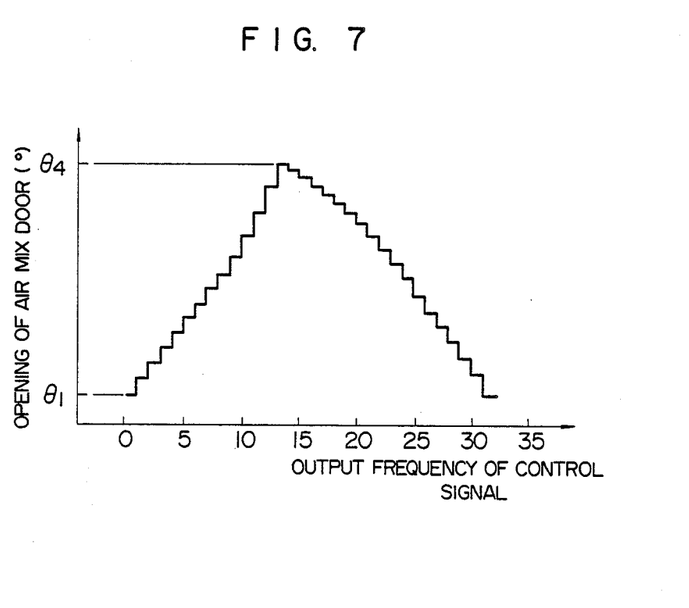
FIG. 7 shows the air mix door opening vs. control signal output frequency characteristics.
Figure 8:
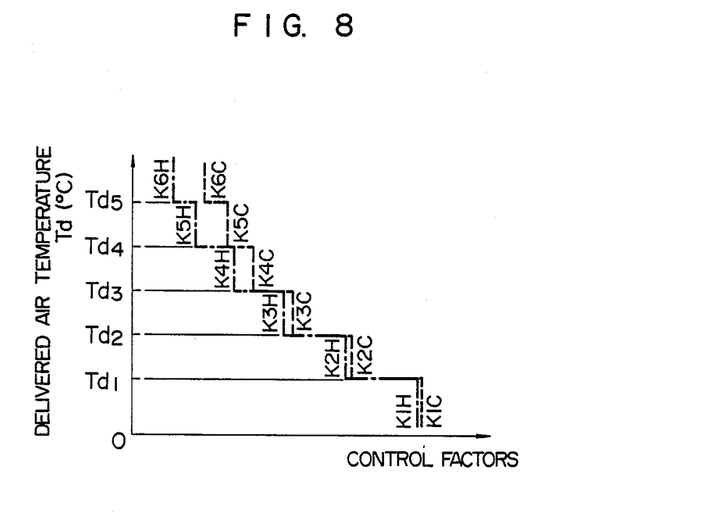
FIG. 8 explains the method of setting control factors against delivered air temperatures.
Figure 9:
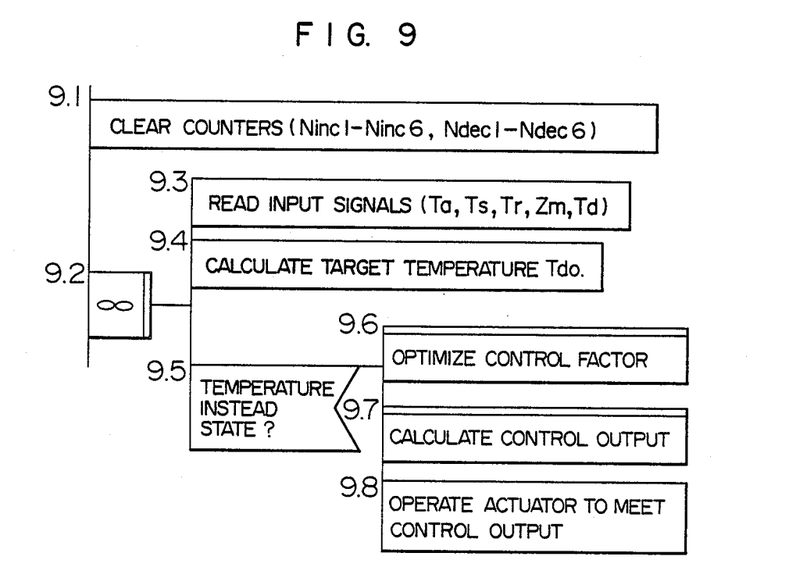
FIGS. 9 through 11 explain the operation of the system.
Figure 10:
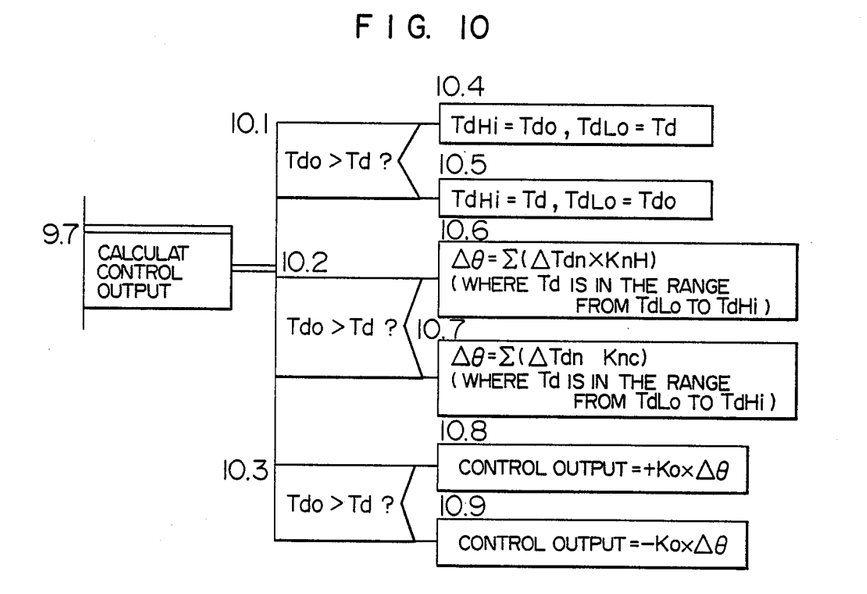
Figure 11:
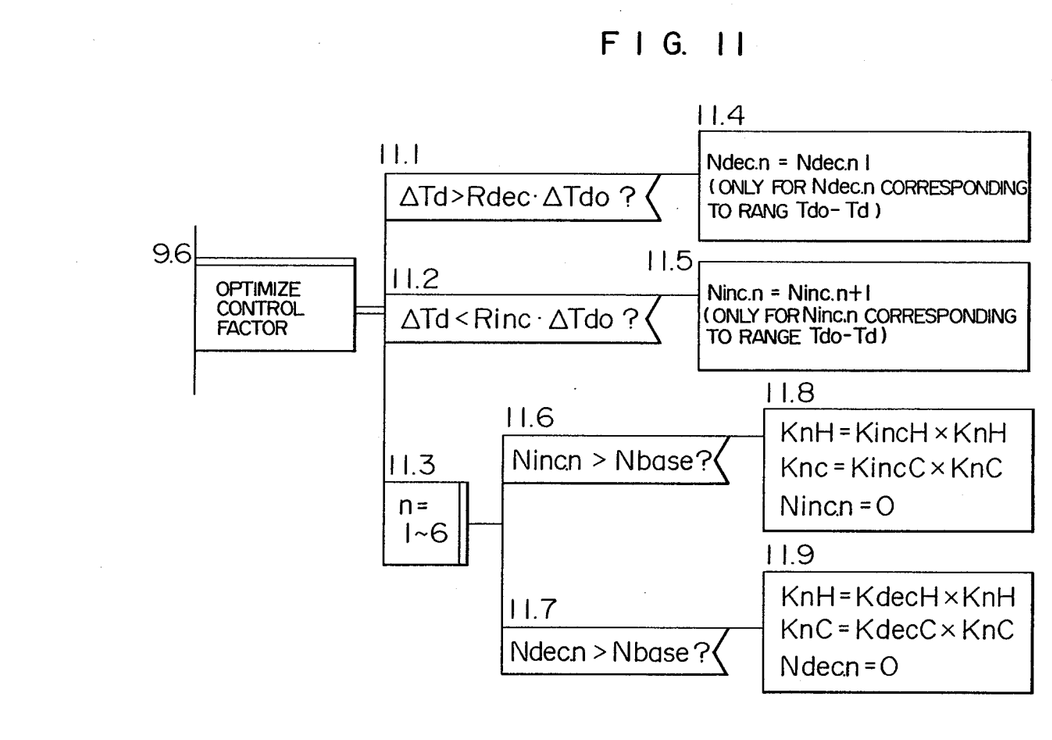

Embodiments of this invention will now be described in detail with reference to FIGS. 1 through 11, of which FIG. 1 is a diagram explaining the principal structure of the air conditioning system, FIG. 2 is a characteristic diagram showing the relation between the opening of air mix door and the temperature of delivered air, FIG. 3 is a diagram explaining the method of determining a unit variation of temperature from the gradient of a mean delivered air temperature, FIG. 4 is a diagram showing the method of determining control factors against delivered air temperatures, FIGS. 5 and 6 are diagrams called PAD's (program analysis diagrams) used to explain the operation of the embodiment, FIG. 7 is a diagram showing the relation between the opening of air mix door and the output frequency of control signal, FIG. 8 is a diagram explaining the method of determining control factors against delivered air temperatures according to another embodiment of this invention, and FIGS. 9 to 11 are PAD's used to explain the operation of the second embodiment.

As shown in FIG. 1, the first embodiment is designed to regulate the heat exchange output by operating the air mix door to have a certain degree of opening. At the air intake port of the air conditioning unit 10, there is installed a blower 13, and an evaporator 11 is disposed by the blower 13. Also disposed inside the air conditioning unit 10 is a heater core 12, and an air mix door 1 is fitted pivotally between the evaporator 11 and heater core 12 so as to dominate the air flow passing through the heater core 12.

A controller 6 receives the output signal of a duct sensor 5, which serves as a delivered air temperature detection means, for detecting the temperature of air delivered by the air conditioning unit 10 which serves as an air conditioner. In addition, the controller 6 receives the output signals produced by a temperature setting device 7 used for setting a desired interior temperature, an exterior air temperature sensor 8 which detects the exterior air temperature, an interior air temperature sensor 9 which detects the cabin interior temperature, and a sun beam sensor 4 which detects the intensity of sun beam.

The duct sensor 5, exterior air temperature sensor 8 and interior air temperature sensor 9 are thermistors, which provides the controller 6 with output signals representing the delivered air temperature Td, exterior ambient temperature Ta and room interior temperature Tr, respectively. The temperature setting device 7 is a potentiometer and the sun beam sensor 4 is a photodiode, which provide output signals representing the setup temperature Ts and sun beam intensity Zm, respectively, for the controller 6.

Connected between output terminals $M_0$ and $M_1$ is an electric actuator 2 which operates the air mix door 1. The electric actuator 2 is supplied with a current with a positive voltage polarity on the output terminal $M_0$ and a negative voltage polarity on the output terminal $M_1$ to swing the air mix door 1 toward position $\theta_1$ for maximum cooling, or it is supplied with a current in the opposite direction to move the door 1 toward position $\theta_4$ for maximum heating.

The controller 6 incorporates a microcomputer, which implements for the controller 6 a target delivered air temperature computation means which calculates the target delivered air temperature Tdo, a first computation means which calculates, for each delivered temperature, a unit variation of heat exchange output required for varying the delivered air temperature Td by a unit temperature difference, and a second computation means which calculates, from the target delivered air temperature Tdo and unit variation, the amount of variation of heat exchange output required for bringing the delivered air temperature Td close to the target temperature Tdo. The microcomputer and electric actuator 2 in unison constitute a control means which regulates the heat exchange output intermittently by controlling the opening of the air mix door 1.

Next, the operation of the embodiment arranged as described above will be explained. The air conditioning unit 10 arranged as described previously on FIG. 1 has nonlinear characteristics between the opening $\theta$ (°) of air mix door 1 and the delivered air temperature Td (°C.), as shown in FIG. 2. Namely, in a range of lower delivered air temperatures Td a difference of opening $\theta$ of the air mix door provides a less variation in the temperature Td, while as the temperature Td rises the rate of temperature variation relative to a difference of door opening $\theta$ inreases. This nonlinearity is based on that with the air mix door 1 having an opening around $\theta_1$–$\theta_2$ for cooling, the heater core 12 exhibits a high resistivity against air conduction, resulting in a little change in the air flow through the heater core 12 in response to an increase in the opening of air mix door 1, whereas with the air mix door 1 having an opening around $\theta_3$–$\theta_4$ for heating, an increase in the opening of the air mix door 1 is followed by a significant variation in the air flow through the heater core 12. The nonlinear characteristics between the opening $\theta$ of air mix door 1 and the delivered air temperature Td shown in FIG. 2 are considered favorable for the comfort of passengers and therefore adopted in general.

FIG. 5 is a PAD showing in part the operation of the embodiment, and it is identical to the operation of the temperature controller for automobile air conditioner proposed in U.S. patent application Ser. No. 093,228 by the applicant of the present invention.

In the figure, step 5.0 indicates that step 5.1 and following steps are executed repeatedly. Step 5.1 introduces input signals used for the calculation of the target delivered air temperature Tdo, the signals representing the exterior temperature Ta, interior temperature Tr, sun beam intensity Zm, and actual delivered air temperature Td which is the control object.

The next step 5.2 determines by calculation the optimal target delivered air temperature Tdo depending on the input signals introduced in step 5.1. In the coming step 5.3, judgement is made as to whether the delivered air temperature Td is in a steady state. The judgement of step 5.3 is intended to prevent the racing of temperature control which would take place when the air mix door 1 is operated at a certain time point and another control signal is issued to the door 1 successively during the transition of the delivered air temperature Td, causing the door 1 to swing improperly. Therefore, the control means implements such an intermittent control as issuing the next control signal after the delivered air temperature Td has settled following an operation of the air mix door 1.

Among several methods of judgement on the steady state of delivered air temperature Td, as described in detail in the above-mentioned U.S. patent application Ser. No. 093,228, a typical one is to determine the temperature Td to be steady when the rate of change of Td is below a certain threshold. Accordingly, step 5.3 examines the difference between delivered air temperature $Td_{last}$ sampled a certain time length ago and the current delivered air temperature Td. If the difference is found smaller than the threshold, indicative of a steady-state temperature, the sequence proceeds to step 5.4 which calculates the control value for the opening of air mix door 1 from the target delivered air temperature Tdo evaluated in step 5.2 and the actual temperature Td.

In this case, because of the nonlinear operational characteristics of the air conditioning unit 10 as mentioned previously, if step 5.4 for calculating the control value produces a duration of current conduction to the electric actuator 2 for the air mix door 1 by simply relying on the difference of the target and actual delivered air temperature, i.e., $\Delta Td = Tdo - Td$, the temperature Td will vary too much in a region of relatively high Td and it will vary too little in a region of relatively low Td, resulting in the failure of stable and responsive control for the delivered air temperature. Particularly, the racing o delivered air temperature can occur in a high temperature region.

Accordingly, step 5.4 in this embodiment calculates the control output in accordance with the PAD shown in FIG. 6. In this embodiment, the first computation means makes polygonal approximation for the characteristic curve by segmenting the curve at points of temperature $Td_1$ through $Td_5$, as shown in FIG. 3, so that the slope Sn of each linear segment represents the variation of delivered air temperature Td for a unit opening of air mix door 1. Therefore, in order for the delivered air temperature Td, which currently resides in the n-th segment, to be varied by a unit temperature, the opening of air mix door 1 needs to be varied by $Kn = 1/Sn$.

As a result of calculation of the value of Kn for each segment, Kn is greater for a region of lower delivered air temperature Td, and it becomes smaller progressively as the temperature Td moves toward a higher region, as shown in FIG. 4. Assuming that the target temperature Tdo is between $Td_4$ and $Td_5$ and the actual temperature Td is between $Td_2$ and $Td_3$, the amount of variation of opening $\Delta\theta_3$ of the air mix door 1 necessary to vary the temperature Td to $Td_3$ is calculated as follows.

$$\Delta\theta_3 = K_3 \cdot (Td_3 - Td) \tag{1}$$

Similarly, the amounts of variation of opening $\Delta\theta_4$ and $\Delta\theta_5$ to have temperature variations from $Td_3$ to $Td_4$ and from $Td_4$ to Tdo are calculated by the following equations (2) and (3), respectively.

$$\Delta\theta_4 = K_4 \cdot (Td_4 - Td_3) \tag{2}$$

$$\Delta\theta_5 = K_5 \cdot (Td_0 - Td_4) \tag{3}$$

Accordingly, the amount of variation of opening $\Delta\theta$ of the air mix door 1 necessary to vary the current delivered air temperature Td to the target temperature Tdo is calculated by the following equation (4).

$$\begin{aligned}\Delta\theta &= \Delta\theta_3 + \Delta\theta_4 + \Delta\theta_5 \\ &= K_3(Td_3 - Td) + K_4(Td_4 - Td_3) + K_5(Td_0 - Td_4)\end{aligned} \tag{4}$$

Through the determination of the control output for the air mix door 1 in compliance with the calculated value $\Delta\theta$, the instability of temperature control of delivered air attributable to the nonlinear characteristics of the air conditioning unit 10 can be overcome.

The procedure of determining the control output will be explained on the PAD of FIG. 6. Steps 6.1, 6.4 and 6.5 are preprocessings for the computation, in which the higher of the actual delivered air temperature Td and target delivered air temperature Tdo is selected to be $Td_Hi$ and the lower is selected to be $Td_Lo$. Step 6.2 calculates the equation (4) for the amount of opening $\Delta\theta$ of the air mix door 1 necessary to have a variation of delivered air temperature from $Td_Lo$ to $Td_Hi$.

Subsequent steps 6.3, 6.6 and 6.7 calculate the control output. In this case, the direction of movement of the air mix door 1 is determined based on the comparison of the target and actual delivered air temperatures Tdo and Td. The amount of variation of opening is given a negative polarity for computation if the door needs to exert cooling or a positive polarity if it needs to exert heating. Steps 6.6 and 6.7 multiply a conversion factor $K_\theta$ to the amount of variation of door opening $\Delta\theta$ evaluated in step 6.2 so that the control output is evaluated finally in terms of the duration of current conduction to the electric actuator 2.

Returning to FIG. 5, step 5.5 activates the electric actuator 2 in accordance with the control output evaluated in steps 6.6 and 6.7, thereby bringing stably the delivered air temperature Td close to the target temperature Tdo.

If, on the other hand, step 5.3 detects that the delivered air temperature Td is not in a steady state, the actuator 2 is held inert, and the process is iterated from step 5.1.

According to this embodiment, even if the air conditioning unit 10 has nonlinear heat exchange characteristics, the amount of variation of opening $\Delta\theta$ of the air mix door is corrected to suit the actual and target delivered air temperatures Td and Tdo, whereby stable and responsive air temperature control is accomplished without using a device for detecting the opening of air mix door 1. Consequently, the temperature controller for automobile air conditioner, with the manufacturing cost being reduced and the reliability and durability being enhanced, is offered.

Next, another embodiment of this invention will be described with reference to FIGS. 7 through 11.

The second embodiment differs from the preceding embodiment, which has been explained for its structure on FIG. 1, on the following two points in the arrangement of the controller 6.

(1) In the computation of control output, the amount of variation of opening $\Delta\theta$ of the air mix door 1 is calculated from the target and actual delivered air temperatures Tdo and Td using different values of control factor for the cases of operating the door 1 in the direction of cooling or in the direction of heating.

(2) An auto-correcting function is provided to modify the control factor when it is judged to be improper.

As will be appreciated from FIG. 1, the air mix door 1 is subjected to a counter torque created by the wind pressure during the operation of the air conditioning unit 10. For example, at an opening position of $\theta_2$, a torque in the direction toward position $\theta_1$ is applied to the door 1, or at position $\theta_3$, a torque toward position $\theta_4$ is applied to the door 1. The heater core 12 is resistive against the air flow, causing the air mix door 1 at position $\theta_2$ to have a relatively low wind velocity and therefore a small counter torque, whereas causing the door 1 at positions $\theta_3$–$\theta_4$ to have a relatively high wind velocity and therefore a large counter torque by the wind pressure.

On this account, unless the electric actuator 2 for driving the air mix door 1 has a sufficient output torque, the door 1 can have different opening values depending on its position despite a constant duration of current condition to the electric actuator 2.

FIG. 7 shows the behavior of the air mix door 1 in such a case, where the opening of air mix door 1 is plotted vertically against the number of outputs of the control signal for driving the electric actuator 2 for a constant duration on the horizontal axis. As will be appreciated from FIG. 7, when the air mix door 1 is operated in the direction of heating, the variation of opening exerted by a unit control signal increases as the opening approaches $\theta_4$ due to an external torque lent by the wind pressure. Conversely, when the air mix door 1 is operated in the direction of cooling toward $\theta_1$, the variation of opening decreases due to a counter torque created by the wind pressure. Besides the torque disturbance caused by the wind pressure, the air mix door 1 has its variation of opening fluctuated depending on the rotational angle due to the characteristics of the door drive link mechanism and the frictional force of the pivot. On this account, the current conduction period for the electric actuator 2 and the variation of opening of the air mix door 1 are not always in one-to-one correspondence, and as a result the delivered air temperature control falls unstable.

Accordingly, the second embodiment of this invention replaces the control function of FIG. 4 with the one shown in FIG. 8, which takes into account the most pronounced deflection of control characteristics by the wind pressure among the influential factors, so that a control factor $Kn_H$ at a position of heating and a control factor $Kn_C$ at a position of cooling have their ratio increasing as the delivered air temperature goes higher (as the opening comes closer to $\theta_4$).

In this embodiment, the control output is calculated by following the PAD of FIG. 10, which differs from that of FIG. 6 in that steps 10.2, 10.6 and 10.7 test the moving direction of the air mix door 1, and n the case of movement in the direction of heating, the control factors $Kn_H$ are used to calculate the variation of opening, while in the case of movement toward cooling, the control factors $Kn_C$ are used to calculate it.

In regard to the distinction between both embodiments itemized in (2), the second embodiment implements control in accordance with a PAD of FIG. 9 in place of FIG. 5. The PAD of FIG. 9 includes peculiar steps 9.1 and 9.6. With the intention of optimizing the control factor, when the maximal variation of delivered air temperature or extremely small response of temperature takes place continuously, the number of occurrence is counted and when the number exceeds a certain value Nbase, the control factors $Kn_H$ or $Kn_C$ are increased or decreased by a certain proportion.

At step 9.1 of FIG. 9, all counters are cleared prior to the computation. Counters Ninc.n are used to increase control factors when the response of temperature is extremely small. The Ninc.n (n=1 to 6) comprise six counters in correspondence to the control factors. Other six counters Ndec.n (n=1 to 6) are provided for counting the number of occurrence of excessive temperature variation. Steps 9.3 through 9.8 are executed repeatedly. The optimizing process for the control factors in step 9.6 is carried out by following the PAD of FIG. 11.

In FIG. 11, step 11.1 examines whether or not the variation of delivered air temperature $\Delta Td$ before and after the operation of the air mix door 1 is greater by a certain proportion Rdec than the variation of target temperature $\Delta Tdo$ before and after the operation of the door 1. If step 11.1 reveals $\Delta Td > Rdec \cdot \Delta Tdo$, indicating the occurrence of an excessive temperature variation, the subsequent step 11.4 up-counts occurrence counters Ndec.n. Counters to be incremented are selected from among n=1 to 6, and these are the counters corresponding to temperatures within the range between the delivered air temperature Td and target temperature Tdo immediately before the air mix door operation signal has been issued (i.e., those with n=m 3, 4 and 5 in the example of FIG. 4). The proportional factor Rdec is a constant greater than or equal to 1.0, and this embodiment takes a value in the range from 1.5 to 2.0.

Step 11.2 examines the occurrence of extremely small response of temperature relative to the variation of target temperature factored by Rinc smaller than or equal to 1.0, and the detection of $\Delta Td < Rinc.\Delta Tdo$ is followed by the execution of step 11.5 which up-counts partinent counters Ninc.n in the same manner as step 11.4. In this embodiment, the proportional factor Rinc is set in the range from 0.5 to 0.7.

Steps 11.6 and 11.7 test whether any counter has reached the predetermined value Nbase, i.e., the number of occurrence of abnormal temperature variation, and the detection is followed by the execution of step 11.8 or 11.9.

Step 11.8 is executed when extremely small temperature variations have occurred Nbase times or more, and it increases the control factors through calculations of $Kn_H = Kinc_H \times Kn_H$ and $Knc = Kinc_C \times Kn_C$. $Kinc_H$ and $Kinc_C$ are constants greater than or equal to 1.0, preferably smaller than or equal to Rinc, and they are set to 1.2 in this embodiment. Following the modification of control factors, corresponding counters are cleared to zero for initialization.

Step 11.9 is executed when control factors need to be reduced, and it decreases the control factors through calculations of $Kn_H = Kdec_H \times Kn_H$ and $Knc = Kdec_C \times Knc$. $Kdec_H$ and $Kdec_C$ are constants smaller than or equal to 1.0, preferably greater than or equal to Rdec, and they are set to 0.83 in this embodiment. Following the modification of control factors, corresponding counters are cleared to zero for initialization.

Step 11.3 repeats the same process for n=1 to 6, and the whole process of FIG. 11 is executed at each issuance of control output thereby to optimize the control factors.

As described, the second embodiment of this invention implements stable control even in case the electric actuator 2 for operating the air mix door 1 does not have a sufficient output torque to overcome a disturbance, or in case the air conditioning unit 10 has a variability of characteristics, and it offers a controller for automobile air conditioner which is outstanding in its reduced manufacturing cost and and high control accuracy.

Although the foregoing embodiments use an electric actuator for operating the air mix door, the present invention is not confined to these embodiments, but a negative pressure of the automobile engine can also be used for operating the air mix door. Although in the foregoing embodiments, the air conditioning unit has a single air mix door and air delivery port, the present invention is not confined to this arrangement, but a plurality of air mix doors and air delivery ports can also be adopted.

According to this invention, as described above in detail, even if the heat exchanger has nonlinear operating characteristics, the delivered air temperature can be controlled directly, stably and responsively without using such as device as a door opening detector as a means of varying the heat exchange output, whereby a temperature controller for automobile air conditioner which is simple in the structure, lower in the manufacturing cost and superior in the reliability and durability is offered.

We claim:

1. A temperature controller for automobile air conditioner comprising target delivered air temperature computation means which calculates a target delivered air temperature from signals of at least an exterior ambient temperature, cabin interior temperature and setup temperature, delivered air temperature detection means which detects the temperature of air delivered by the air conditioner and heat exchange output control means which controls the heat exchange output to vary the delivered air temperature so that the detected value of the delivered air temperature is brought convergently to the target value, wherein said controller comprising first computation means which calculates, in correspondence to each delivered air temperature, a unit variation of heat exchange output required to vary the delivered air temperature by a unit temperature difference; a second computation means which calculates the amount of variation of heat exchange output, which is required to bring the delivered air temperature close to the target temperature, from the target delivered air temperature, the detected delivered air temperature and the unit variation, and control means which controls the heat exchange output intermittently in compliance with the amount of variation evaluated by the second computation means.

2. A temperature controller for automobile air conditioner according to claim 1, wherein said first computation means divides a range of delivered air temperature into a plurality of sections and calculates a unique unit variation for each section, and said second computation means calculates the amount of variation of heat exchange output required to bring the delivered air temperature close to the target temperature in accordance with the temperature range of each section and unit variation.

3. A temperature controller for automobile air conditioner according to claim 2, wherein said unit variation of a section is proportional to the reciprocal of the gradient of a mean delivered air temperature of the section.

4. A temperature controller for automobile air conditioner according to claim 1, wherein said unit variation has different values depending on the polarity of deviation of the detected value of delivered air temperature from the target value.

5. A temperature controller for automobile air conditioner according to claim 1, wherein said unit variation is modified depending on the variation of delivered air temperature $\Delta Tdo$ and the variation of target delivered air temperature $\Delta Tdo$ before and after the control of heat exchange output and constants Rdec, Rinc and Nbase, such that said unit variation is modified to the smaller when states of $\Delta Td > Rdec.\Delta Tdo$ have occurred Nbase times or more, or said unit variation is modified to the larger when states of $\Delta Td < Rinc.\Delta Td$ have occurred Nbase times or more.

* * * * *